US008077632B2

(12) United States Patent
Samuels et al.

(10) Patent No.: US 8,077,632 B2
(45) Date of Patent: Dec. 13, 2011

(54) AUTOMATIC LAN/WAN PORT DETECTION

(75) Inventors: Allen R. Samuels, San Jose, CA (US);
Paul G. Sutter, San Francisco, CA (US);
Robert D. Plamondon, Blodgett, OR (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 608 days.

(21) Appl. No.: 11/301,825

(22) Filed: Dec. 12, 2005

(65) Prior Publication Data
US 2006/0159029 A1 Jul. 20, 2006

Related U.S. Application Data

(60) Provisional application No. 60/645,846, filed on Jan. 20, 2005.

(51) Int. Cl.
*H04L 12/28* (2006.01)
*H04L 12/56* (2006.01)
*H04J 3/16* (2006.01)
*G06F 15/173* (2006.01)

(52) U.S. Cl. ......... 370/254; 370/401; 370/465; 709/225
(58) Field of Classification Search .................. 370/465
See application file for complete search history.

(56) References Cited

U.S. PATENT DOCUMENTS

| | | | |
|---|---|---|---|
| 5,159,592 A | 10/1992 | Perkins | |
| 5,345,588 A | 9/1994 | Greenwood et al. | |
| 5,410,543 A | 4/1995 | Seitz et al. | |
| 5,517,617 A | 5/1996 | Sathaye et al. | |
| 5,566,225 A | 10/1996 | Haas | |
| 5,655,081 A | 8/1997 | Bonnell et al. | |
| 5,657,390 A | 8/1997 | Elgamal et al. | |
| 5,737,416 A | 4/1998 | Cooper et al. | |
| 5,838,682 A | 11/1998 | Dekelbaum et al. | |
| 5,898,674 A | 4/1999 | Mawhinney et al. | |
| 5,933,412 A | 8/1999 | Choudhury et al. | |
| 5,968,176 A | 10/1999 | Nessett et al. | |
| 5,978,848 A | 11/1999 | Maddalozzo, Jr. et al. | |
| 5,983,227 A | 11/1999 | Nazem et al. | |

(Continued)

FOREIGN PATENT DOCUMENTS

EP 0493286 7/1992

(Continued)

OTHER PUBLICATIONS

International Preliminary Report on Patentability, PCT/US2004/024655, Feb. 9, 2006, 7 pages.

(Continued)

*Primary Examiner* — Daniel J Ryman
*Assistant Examiner* — Cassandra Decker
(74) *Attorney, Agent, or Firm* — Foley and Lardner LLP; Christopher J. McKenna (57) ABSTRACT

A system is disclosed for which a network device with two or more ports determines which of its functions should be performed on which of its ports. A method is disclosed for monitoring the traffic on each port for characteristic traffic that indicates the function that said network device should perform on said port, optionally transmitting new traffic or altering or tagging existing traffic to elicit it, and mapping said network device's operations to its ports accordingly. Also disclosed is a system and method for auto inhibition and auto configuration.

24 Claims, 7 Drawing Sheets

U.S. PATENT DOCUMENTS

| | | | |
|---|---|---|---|
| 6,058,480 A | 5/2000 | Brown | |
| 6,061,796 A | 5/2000 | Chen et al. | |
| 6,101,543 A | 8/2000 | Alden et al. | |
| 6,131,110 A | 10/2000 | Bates et al. | |
| 6,147,986 A | 11/2000 | Orsic | |
| 6,158,007 A | 12/2000 | Moreh et al. | |
| 6,167,449 A | 12/2000 | Arnold et al. | |
| 6,236,643 B1* | 5/2001 | Kerstein | 370/254 |
| 6,252,851 B1 | 6/2001 | Siu et al. | |
| 6,253,188 B1 | 6/2001 | Witek et al. | |
| 6,253,326 B1 | 6/2001 | Lincke et al. | |
| 6,292,172 B1 | 9/2001 | Makhlouf | |
| 6,308,213 B1 | 10/2001 | Valencia | |
| 6,314,406 B1 | 11/2001 | O'Hagan et al. | |
| 6,343,318 B1 | 1/2002 | Hawkins et al. | |
| 6,397,259 B1 | 5/2002 | Lincke et al. | |
| 6,411,986 B1 | 6/2002 | Susai et al. | |
| 6,452,915 B1 | 9/2002 | Jorgensen | |
| 6,457,052 B1 | 9/2002 | Markowitz et al. | |
| 6,463,470 B1 | 10/2002 | Mohaban et al. | |
| 6,466,984 B1 | 10/2002 | Naveh et al. | |
| 6,487,598 B1 | 11/2002 | Valencia | |
| 6,499,107 B1 | 12/2002 | Gleichauf et al. | |
| 6,502,102 B1 | 12/2002 | Haswell et al. | |
| 6,516,315 B1 | 2/2003 | Gupta | |
| 6,523,027 B1 | 2/2003 | Underwood | |
| 6,539,429 B2 | 3/2003 | Rakavy et al. | |
| 6,590,588 B2 | 7/2003 | Lincke et al. | |
| 6,595,417 B2 | 7/2003 | O'Hagan et al. | |
| 6,601,233 B1 | 7/2003 | Underwood | |
| 6,609,128 B1 | 8/2003 | Underwood | |
| 6,611,522 B1 | 8/2003 | Zheng et al. | |
| 6,633,878 B1 | 10/2003 | Underwood | |
| 6,640,248 B1 | 10/2003 | Jorgensen | |
| 6,658,624 B1 | 12/2003 | Savitzky et al. | |
| 6,687,745 B1 | 2/2004 | Franco et al. | |
| 6,691,232 B1 | 2/2004 | Wood et al. | |
| 6,701,514 B1 | 3/2004 | Haswell et al. | |
| 6,704,873 B1 | 3/2004 | Underwood | |
| 6,718,380 B1 | 4/2004 | Mohaban et al. | |
| 6,718,535 B1 | 4/2004 | Underwood | |
| 6,751,453 B2 | 6/2004 | Schemers et al. | |
| 6,751,673 B2 | 6/2004 | Shaw | |
| 6,788,682 B1* | 9/2004 | Kimmitt | 370/389 |
| 6,801,499 B1 | 10/2004 | Anandakumar et al. | |
| 6,850,252 B1 | 2/2005 | Hoffberg | |
| 6,859,776 B1 | 2/2005 | Cohen et al. | |
| 6,880,086 B2 | 4/2005 | Kidder et al. | |
| 6,888,927 B1 | 5/2005 | Cruickshank et al. | |
| 6,907,546 B1 | 6/2005 | Haswell et al. | |
| 6,928,473 B1 | 8/2005 | Sundaram et al. | |
| 6,954,801 B1* | 10/2005 | Housel | 709/247 |
| 6,970,552 B1 | 11/2005 | Hahn et al. | |
| 6,981,143 B2 | 12/2005 | Mullen et al. | |
| 6,981,180 B1 | 12/2005 | Bailey et al. | |
| 7,000,031 B2 | 2/2006 | Fischer et al. | |
| 7,016,973 B1 | 3/2006 | Sibal et al. | |
| 7,025,209 B2 | 4/2006 | Hawkins | |
| 7,027,975 B1 | 4/2006 | Pazandak et al. | |
| 7,039,828 B1 | 5/2006 | Scott | |
| 7,043,225 B1 | 5/2006 | Patel et al. | |
| 7,055,028 B2 | 5/2006 | Peiffer et al. | |
| 7,068,641 B1 | 6/2006 | Allan et al. | |
| 7,092,502 B2 | 8/2006 | Mohn et al. | |
| 7,100,195 B1 | 8/2006 | Underwood | |
| 7,123,613 B1 | 10/2006 | Chawla et al. | |
| 7,143,153 B1 | 11/2006 | Black et al. | |
| 7,200,153 B2* | 4/2007 | Feuerstraeter et al. | 370/465 |
| 7,225,244 B2 | 5/2007 | Reynolds et al. | |
| 7,227,872 B1* | 6/2007 | Biswas et al. | 370/465 |
| 7,280,547 B2* | 10/2007 | Featherston et al. | 370/401 |
| 7,673,074 B1* | 3/2010 | Sebastian et al. | 709/250 |
| 2001/0030970 A1* | 10/2001 | Wiryaman et al. | 370/401 |
| 2002/0006790 A1 | 1/2002 | Blumenstock et al. | |
| 2002/0010866 A1 | 1/2002 | McCullough et al. | |
| 2002/0016851 A1 | 2/2002 | Border | |
| 2002/0034173 A1* | 3/2002 | Border et al. | 370/338 |
| 2002/0035683 A1 | 3/2002 | Kaashoek et al. | |
| 2002/0042839 A1 | 4/2002 | Peiffer et al. | |
| 2002/0052931 A1 | 5/2002 | Peiffer et al. | |
| 2002/0115407 A1 | 8/2002 | Thompson et al. | |
| 2002/0147822 A1 | 10/2002 | Susai et al. | |
| 2003/0014625 A1 | 1/2003 | Freed et al. | |
| 2003/0026241 A1 | 2/2003 | Ono et al. | |
| 2003/0033520 A1 | 2/2003 | Peiffer et al. | |
| 2003/0112809 A1 | 6/2003 | Bharali et al. | |
| 2003/0115331 A1 | 6/2003 | Xie et al. | |
| 2003/0123481 A1 | 7/2003 | Neale et al. | |
| 2003/0149715 A1 | 8/2003 | Ruutu et al. | |
| 2003/0188001 A1 | 10/2003 | Eisenberg et al. | |
| 2003/0226038 A1 | 12/2003 | Raanan et al. | |
| 2004/0015591 A1 | 1/2004 | Wang | |
| 2004/0103438 A1 | 5/2004 | Yan et al. | |
| 2004/0250124 A1 | 12/2004 | Chesla et al. | |
| 2005/0013280 A1 | 1/2005 | Buddhikot et al. | |
| 2005/0135250 A1 | 6/2005 | Singh et al. | |
| 2005/0144186 A1 | 6/2005 | Hesselink et al. | |
| 2005/0149481 A1 | 7/2005 | Hesselink et al. | |
| 2005/0232161 A1 | 10/2005 | Maufer et al. | |
| 2006/0126616 A1* | 6/2006 | Bhatia | 370/389 |
| 2006/0206931 A1 | 9/2006 | Dillaway et al. | |
| 2006/0215684 A1* | 9/2006 | Capone | 370/437 |
| 2007/0106681 A1 | 5/2007 | Haot et al. | |
| 2007/0160063 A1 | 7/2007 | Mynam et al. | |

FOREIGN PATENT DOCUMENTS

WO      WO-00/35163      6/2000

OTHER PUBLICATIONS

Border, J. et al., "Performance Enhancing Proxies Intended to Mitigate Link-Related Degradations," PILC—Perfomance Enhancing Proxies, Jun. 2001, pp. 1-45, RFC 3135.

Border, J. et al., PILC: Performance Enhancing Proxies (PEPs), 46$^{th}$ IETF, Nov. 10, 1999, pp. 1-17.

Davison, B. et al., "A Split Stack Approach to Mobility-Providing Performance-Enhancing Proxies," Lehigh University, Nov. 2002, pp. 1-13, Bethlehem, PA.

Ehsan, N. et al., "Evaluation of Performance Enhancing Proxies in Internet Over Satellite," International Journal of Communication Systems, Sep. 17, 2002, 22 pages.

Notification of Transmittal of the International Search Report and the Written Opinion of the International Searching Authority, or the Declaration, PCT/US04/24655, Jun. 10, 2005, 9 pages.

Vangala, S. et al., "Performance of TCP Over Wireless Networks With the Snoop Protocol," University of South Florida, 2 pages, Tampa, FL.

International Search Report for PCT/US2008/051993, mailed on Oct. 1, 2008.

Written Opinion of the ISA for PCT/US2008/051993, mailed on Oct. 1, 2008.

Spatcheck, O. et al., "Optimizing TCP Forwarder Performance", IEEE/ACM Transactions on Networking, Apr. 1, 2000.

Yamanegi K. et al., "Implementation Experiments of the TCP Proxy Mechanism", Nov. 9, 2005.

Jacobson et. al., "TCP Extensions for High Performance", May 1, 1992.

IETF, Transmission Control Protocol, Darpa Internet Program Protocol Specification, Sep. 1, 1981.

International Search Report for PCT/US04/24655, mailed Jun. 21, 2005.

Written Opinion of the ISA for PCT/US04/24655, mailed on Jun. 21, 2005.

International Search Report for PCT/US08/56528 mailed Oct. 10, 2008.

Written Opinion for PCT/US08/56528 mailed Oct. 10, 2008.

* cited by examiner

AUTOMATIC LAN/WAN PORT DETECTION

CROSS REFERENCE TO RELATED APPLICATIONS

This application claims a benefit of, and priority under 35 U.S.C. §119 to U.S. Provisional Application Ser. No. 60/645,846, filed Jan. 20, 2005 by Allen R. Samuels, et al., entitled "Automatic LAN/WAN Port Detection." This application is related to U.S. Pat. No. 7,656,799, filed on Jul. 28, 2004, entitled "Flow Control System Architecture", the contents of which are hereby incorporated by reference.

BACKGROUND OF THE INVENTION

1. Field of the Invention

This invention relates generally to the field of networking, and specifically to the field TCP/IP networking.

2. Description of the Related Art

A variety of devices use multiple network ports, with each port assigned to a specific task. For example, a residential Internet firewall/gateway device may have two Ethernet ports, one marked "Internet" and the other "LAN" (local area network). If the user's Ethernet cables are plugged into the wrong ports, the device will not function properly. However, both ports are identical electrically. The assignment of one of them as the "Internet" port is made by the unit's software.

Although ports on a device are often prominently displayed, users frequently plug cables into the wrong port. This causes confusion and frustration among users, and results in increased customer support costs to the unit's provider.

In addition to port configuration, other aspects of network unit configuration are unnecessarily cumbersome. For example, many router units, such as home use routers, will leave the factory pre-set with an arbitrary network address. If such a unit is installed into a network with nodes set to a different address, it must be changed. However, changes made for the address often result in communication failures with the rest of the network. Because home routers generally use network-based setup, this presents a deadlock. One solution is to temporarily change the address of a computer on the network to enable it to talk to the router, and then change it back after the router's address has changed. However, such approaches are too cumbersome for the users and often results in unintended errors.

From the above, there is a need for a system and process to (1) automatically configure a device to detect a fast side and a slow side of network, (2) determine where an existing network includes dynamic host configuration protocol before launching such a service, and (3) allow for adaption to an existing environment rather than forcing a preconfigured setting to a network.

SUMMARY OF THE INVENTION

The present invention includes a system and a method for automatically detecting a slow side connection (e.g., a wide area network (WAN) connection such as an Intranet) and a fast side connection (e.g., a local area network (LAN) connection). In one embodiment, an apparatus is configured to automatically determine a network connection on a port. The apparatus includes two or more ports, with a first port connectable to one network and a second port connectable to another network. The device is configured to monitor network traffic on the first port and the second port to detect a synchronization packet. The device is also configured to identify receipt of a synchronization packet that is tagged with an acknowledgement packet and on which port it is received. The device then configures itself to operate the identified port on which the tagged synchronization packet arrived so that the speed on that port is set to be the speed associated with the network connected to that port. The other port is then set to the speed associated with the network connected to that port.

Thus, the present invention beneficially provides for a system and a process to allow a device to automatically self configure itself for connection to a network at an appropriate speed on each attached port. With no user intervention to set the appropriate speed, the system is configured with minimal to no errors and at greater efficiency, hence, increasing device and network utilization.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

The invention has other advantages and features which will be more readily apparent from the following detailed description of the invention and the appended claims, when taken in conjunction with the accompanying drawings, in which:

Figure (FIG.) 1 illustrates one embodiment of communication between devices in a network over a wide area network in accordance with the present invention.

DETAILED DESCRIPTION OF THE PREFERRED EMBODIMENTS

The Figures (FIG.) and the following description relate to preferred embodiments of the present invention by way of illustration only. It should be noted that from the following discussion, alternative embodiments of the structures and methods disclosed herein will be readily recognized as viable alternatives that may be employed without departing from the principles of the claimed invention.

Reference will now be made in detail to several embodiments of the present invention(s), examples of which are illustrated in the accompanying figures. It is noted that wherever practicable similar or like reference numbers may be used in the figures and may indicate similar or like functionality. The figures depict embodiments of the present invention for purposes of illustration only. One skilled in the art will readily recognize from the following description that alternative embodiments of the structures and methods illustrated herein may be employed without departing from the principles of the invention described herein.

Auto-configuration Through Fast/Slow Detection

Figure 1:
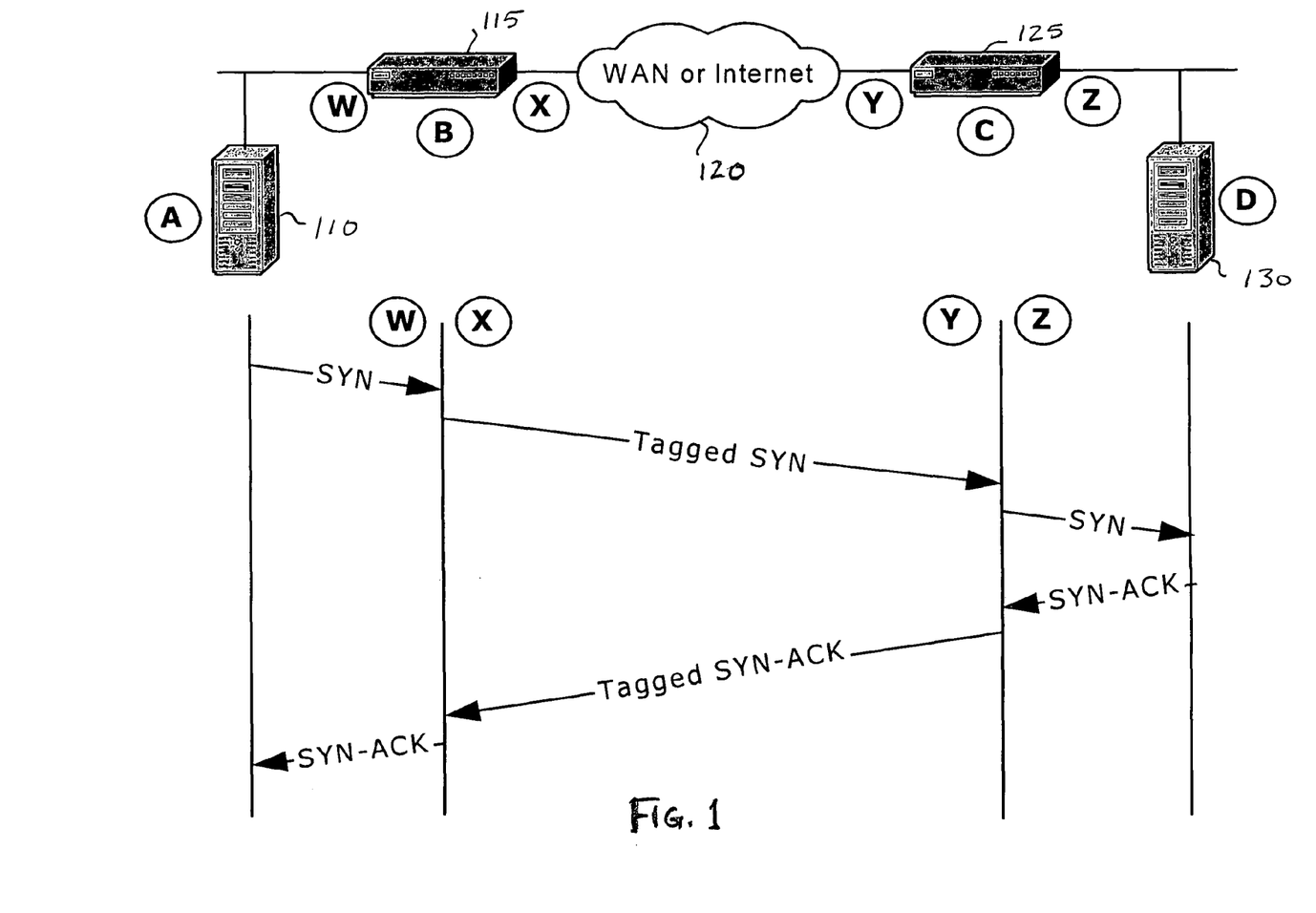

FIG. 1 illustrates one embodiment of communication between devices in a network over a wide area network in accordance with the present invention. The network includes a first local system A (or end node A), a first enhanced performance enhancing proxy (PEP) B, a second PEP C, and a second local system D (or end node D). The first local system A communicatively couples the first enhanced PEP B through a network, e.g., a local area network (or LAN), and the second local system D communicatively couples the second enhanced PEP C through another network, e.g., another LAN. The two enhanced PEPs, PEP B and PEP C, communicatively couple with each other through a wide area network, e.g., the Internet. In one embodiment, the enhanced PEP B and PEP C may be configured so that each is aware of the other's presence. Further, the enhanced PEPs B, C are configured to accelerate transmission control protocol (TCP) connections on Internet Protocol (IP) networks.

In one embodiment, the configuration illustrated in FIG. 1 may be structured to allow for auto-discovery by an enhanced PEP, e.g., PEP B and/or PEP C, of a network to which it connects. For example, an auto-discovery mechanism in operation in accordance with FIG. 1 functions as follows: PEP B and PEP C are placed in line with the connection linking end nodes A and D. The PEP B and PEP C are at the ends of a low-speed link, e.g., Internet, connecting two LANs. In one example embodiment, PEP B and PEP C each include two ports—one to connect with the "low" speed link and the other to connect with a "high" speed link, e.g., a LAN. Any packet arriving at one port is copied to the other port. Thus, PEP B and PEP C are each configured to function as a bridge between the two networks.

When an end node opens a new TCP connection with another end node it addresses a TCP packet with a synchronization (SYN) header bit set to the other end node. In the present example, end node A opens a connection to end node D. When the SYN packet passes through PEP B, it attaches a characteristic TCP header option to the packet, which announces its presence. If the packet happens to pass through a second PEP, in this example PEP C, the second PEP C notes the header option on the SYN packet. The end node D responds to the SYN packet with a synchronization acknowledgment (SYN-ACK) packet.

When the SYN-ACK packet passes through PEP C, a TCP header option is tagged (e.g., attached) to the SYN-ACK packet to announce PEP C's presence to PEP B. When PEP B receives this packet, both PEPs are now aware of each other and the connection can be appropriately accelerated. An embodiment of this process is described in U.S. patent application Ser. No. 10/901,952, filed on Jul. 28, 2004, entitled "Flow Control System Architecture," the contents of which are hereby incorporated by reference.

Figure 2:
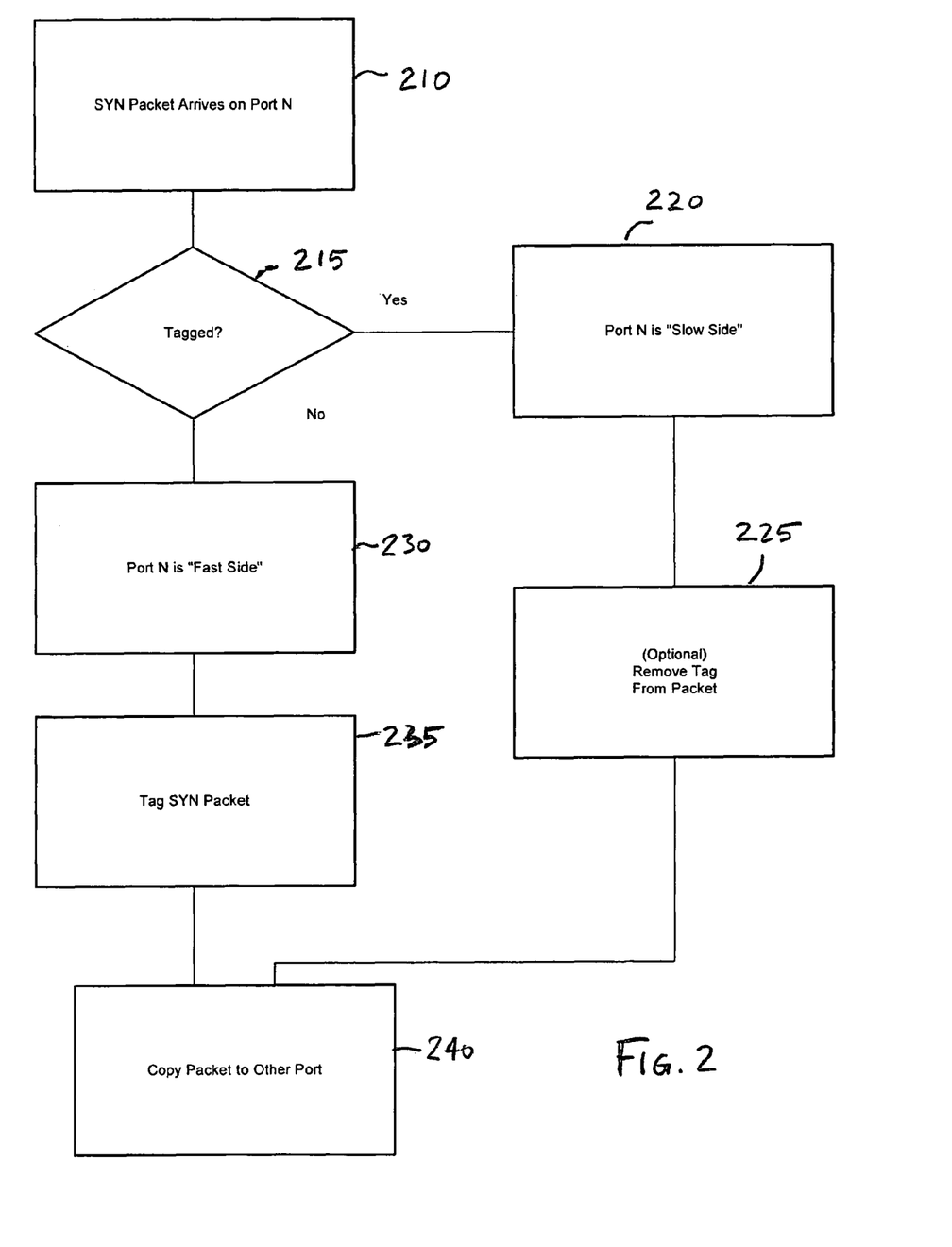
FIGS. 2 and 3 illustrate embodiments of a process for detecting fast and slow sides of a network in accordance with the present invention.
Figure 3:
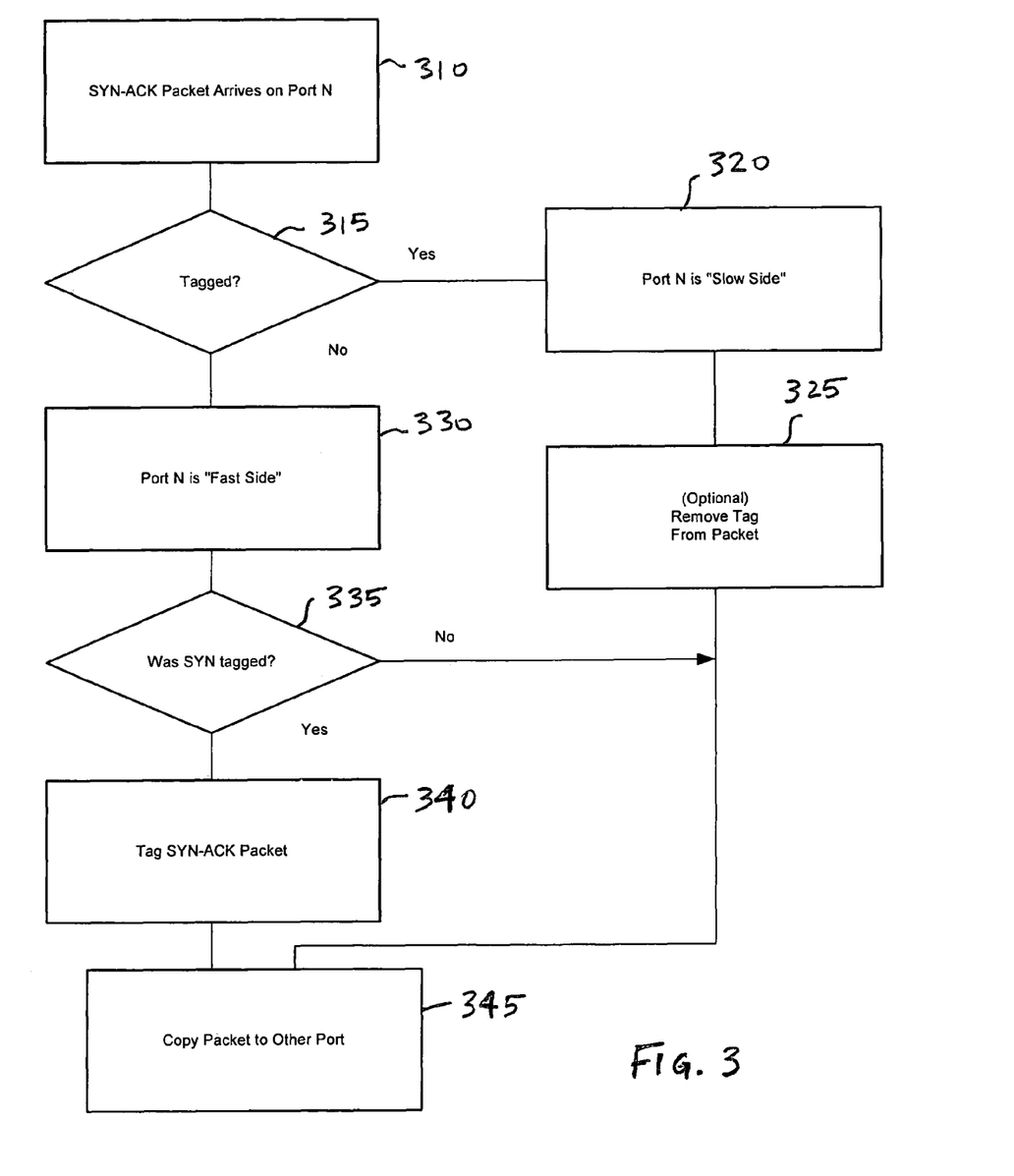

FIGS. 2 and 3 illustrate embodiments of a process for detecting "fast" and "slow" sides of a network in accordance with the present invention. For ease of discussion herein, reference to "fast" side will be made with respect to connection with a wide area network (WAN), e.g., the Internet, and operating at a network speed of the WAN. Likewise, reference to "slow" side will be made with respect to connection with a local area network (LAN) and operating at a network speed the LAN. However, it is noted that "fast" and "slow" sides in a network can change on a per-connection basis. Such configurations are particularly useful in complex network topologies, where a network is "fast" or "slow" only when compared to adjacent networks and not in any absolute sense.

Turning now to FIG. 2, it illustrates a process for detecting "fast" and "slow" sides of a network using a SYN packet. The process illustrates SYN processing 210 followed by determination 215 of whether the SYN packet is tagged with an acknowledgement (ACK). If it is tagged, the process identifies 220 (or configures) the port receiving the tagged SYN packet (SYN-ACK) as the "slow" side. The process optionally can remove 225 the ACK tag from the packet before copying the packet to the other port. If the process determines 215 that the packet is not tagged, the process identifies 230 (or configures) the port receiving the untagged packet as the "fast" side. The process then tags 235 the SYN packet with an ACK and copies 240 the packet to the other port.

Referring next to FIG. 3, it illustrates a process for detecting fast and slow sides of a network using a SYN-ACK packet. The process illustrates SYN-ACK processing 310 followed by determination 315 of whether the SYN-ACK packet is tagged with an acknowledgement (ACK). If it is tagged, the process identifies 320 (or configures) the port receiving the tagged SYN packet (SYN-ACK) as the "slow" side. The process optionally can remove 325 the ACK tag from the packet before copying the packet to the other port. If the process determines 315 that the packet is not tagged, the process identifies 330 (or configures) the port receiving the untagged packet as the "fast" side. The process determines 335 whether the SYN packet was tagged. If the SYN packet was not tagged, it is copied 345 to the other port. If the SYN packet was tagged, the process tags 340 the SYN-ACK packet before copying 345 to the other port.

An advantage of a process in accordance with the present invention is that particular ports, e.g., of an apparatus, need not be unnecessarily predetermined to be dedicated to one network or another via pre-configured software or hardware. Such configuration often results in confusion if not properly labeled or network failure if not properly connected to the appropriate networks. A configuration in accordance with the present invention eliminates these, and other, issues in a network.

The principles disclosed herein are applicable in non-PEP implementations. In particular, automated assignment of ports can occur whenever a device performs different functions on different ports, where the assignment of a port to a task can be made during the unit's operation, and/or the nature of the network segment on each port is discoverable by software.

As an example, one alternative embodiment involves a residential gateway/firewall, intended to provide connectivity between a small LAN or single computer and the Internet. In such embodiments, an approach is to predesignate and statically map ports to appropriate network connections, e.g., one port set for "Internet" and one for a "LAN." One reason for this alternative embodiment is such gateways leverage Internet Control Messaging Protocol (ICMP) broadcast requests such as "ICMP Address Mask Request." These requests are more convenient than those that require a specific destination address, particularly when the sender does not know or cannot provide its own address. Like problems with respect to pre-designation and static mapping of ports arise with Dynamic Host Configuration Protocol (DHCP) client requests.

Further, conventional services provided by a gateway/firewall are asymmetric. To prevent illicit access to the LAN, packets coming in from the Internet are blocked unless they match certain rules; this is the "firewall" portion. Packets traveling in the other direction are provided with network address translation to allow any number of computers on the LAN to share a single Internet address. This is part of the gateway function. In addition, other services such as IP address assignment, routing, HTTP proxy serving, etc. may be performed by the gateway/firewall.

The present invention beneficially provides for flexibility in application to various network devices. For example, if more ports are added, creating an n-port (n=any integer) bridge, gateway, or router, a process (and apparatus) is able to function as disclosed herein. As an example, FIG. 4 illustrates an embodiment of gateway in a communications network in accordance with the present invention.

Figure 4:
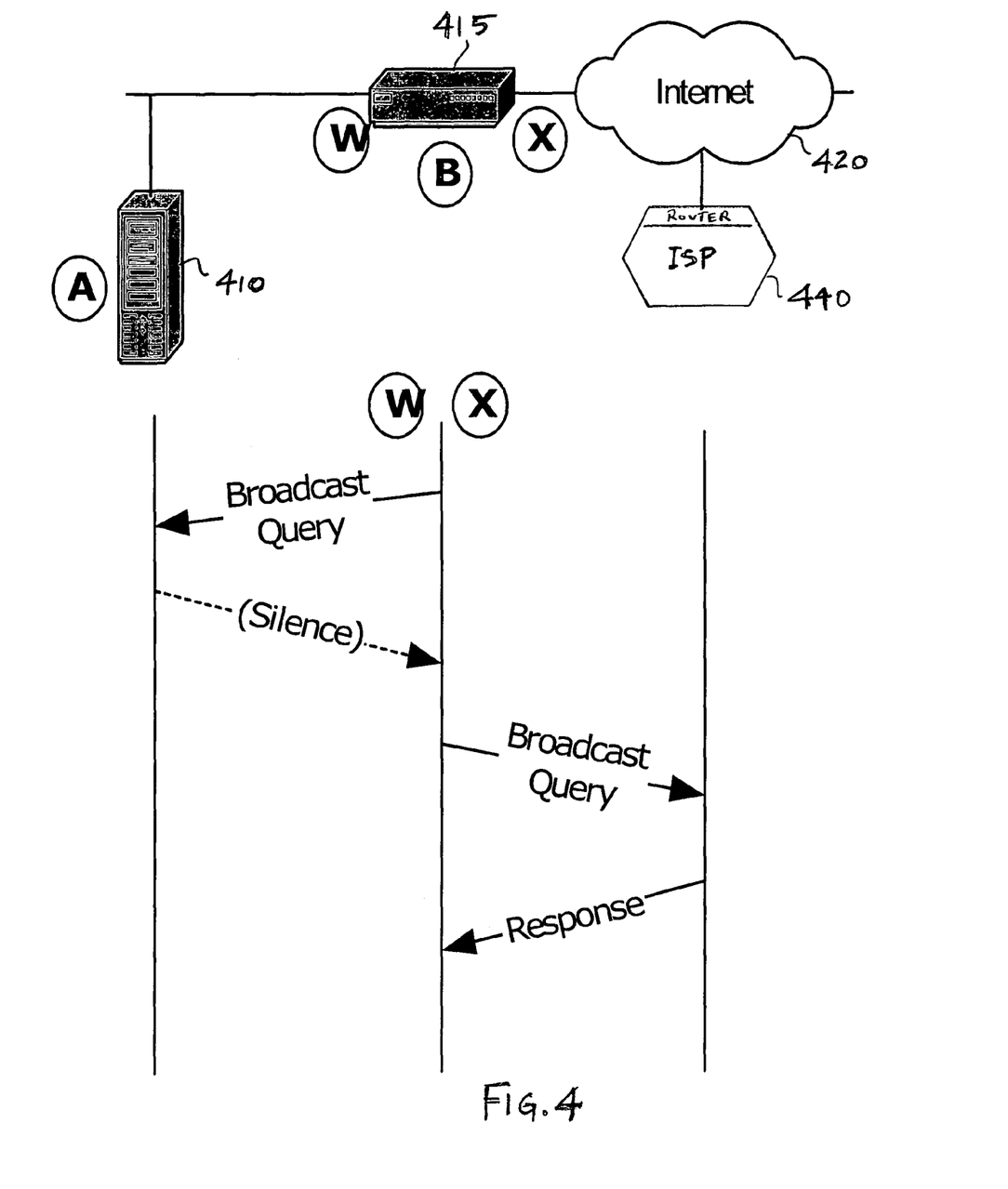
FIG. 4 illustrates an embodiment of a gateway in a communications network in accordance with the present invention.

The communication network illustrated in FIG. 4 includes an end node 410 (e.g., an end-user or host system), a gateway 415, and an Internet Service Provider (ISP) 440. In this embodiment, the gateway 415 includes a first port (not shown) and a second port (not shown) through which network connections are made. The gateway 415 also includes a memory, a processor (or controller or state machine), and other appropriate hardware and software components as necessary (e.g., firmware or operating system, non-volatile storage, and the like).

The end node 410 connects with a LAN and communicatively couples the gateway 415 through the first port on the gateway 415. Through the second port, the gateway 415 couples a wide area network, e.g., the Internet, 420, and more particularly, is communicatively coupled with the ISP 440 through a router associated with the ISP 440.

In this example embodiment, the end node 410 on the LAN does not have a router that responds to broadcast queries such as "ICMP Address Mask Request." However, a router associated with the ISP 440 will provide a response to such messages. The second port on the gateway 415 receives a response from the ISP router. Thereafter, software (or firmware) in accordance with the present invention, identifies receipt of such information and configures the second port, which received the response from the ISP router, as the "Internet" port and the first port as the "LAN" port. In addition, this configuration information may be stored in the non-volatile memory (or other storage) in the gateway 415 for subsequent use. Alternatively, the process can run each time the gateway 415 is powered down and then back up, thus allowing for dynamic configuration and added flexibility with respect to implementation.

Thus, in accordance with one embodiment of the present invention, an auto-assignment of ports is accomplished by detecting which port is attached to a particular segment of an overall network. The detection may be done actively, passively, or a combination thereof. The ports and appropriate network connections are then identified and the ports are appropriately configured for operation with the particular network segment, as previously described.

In addition, the process can also be configured to obtain and store additional information relating to the network segment and it connection. For example, protocols, such as ARP, RARP, DHCP, RIP, BOOTP, EtherBoot, etc. return information about the attached networks, including their degree of connectivity, the network services already being provided, and the like.

Example Hardware Architecture

Figure 5:
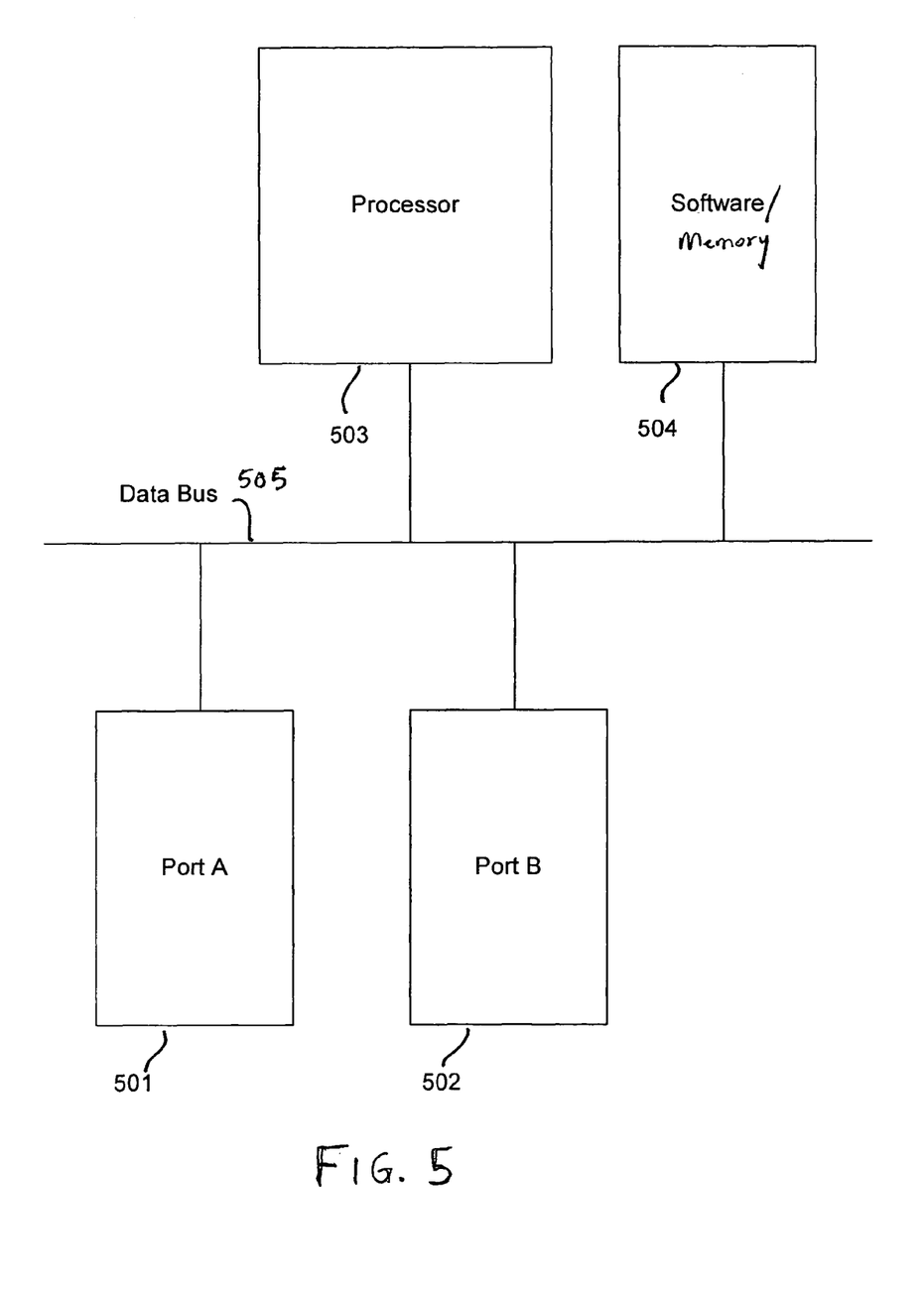
FIG. 5 illustrates an embodiment of hardware architecture for a device having a plurality of ports for use with the present invention.

FIG. 5 illustrates an embodiment of hardware architecture for a device having a plurality of ports for use with the present invention. The hardware device may be a bridge, a router, a gateway, or the like. For ease of discussion, FIG. 5 will be described in the context of the enhanced PEPs B 115 and C 125. This example embodiment includes two or more ports, e.g., a first port 501 and a second port 502, which are electrically equivalent, a processor 503, and software 504. The software 504 is configured to include instructions (e.g., code for executing the process described herein) in memory that are executed by the processor 503. The ports 501, 502, the processor 503, and the software 504 are coupled through a data bus 505.

In this embodiment, because the ports 501 and 502 are electrically equivalent, there is no need to have a predetermined or preconfigured designation of which port is for connection with a "slow" side, e.g., a LAN, and which port is for connection with a "fast" side, e.g., a WAN. Rather, in accordance with the processes disclosed herein, the present invention is beneficially configurable to assign an appropriate role or function to each port based on the behavior of the attached networks or of the other PEP in the network.

Auto-inhibition And Auto-configuration

Devices such as a firewall, a router, or a gateway typically provide a DHCP server that announces that it is a router to the Internet. Thereafter, such device assigns a temporary Internet addresses to any local site requesting them. However, a DHCP server must acquire its own Internet address by means other than DHCP, because of a "bootstrap problem" in which a DHCP server cannot query itself for its own address if it does not know it already.

In accordance with one embodiment of the present invention, a device may use DHCP client calls to detect information about the network topology and the existence of other DHCP servers, with which its operation might conflict. If the unit broadcasts such DHCP client requests on each of its ports, it can determine which network segments are already supplied with such services, and can refrain from starting its own DHCP server in these cases, preventing confusing duplications. This is referenced as "auto-inhibition."

An auto-inhibition process may also be configured to probe a network to see which addresses are in use. Networks that are not connected to the Internet except through a gateway providing network address translation, e.g., as in the case of a LAN, generally use reserved network numbers such as 10.0.0.0. Such addresses imply a private network. Since firewalling functions are required at public/private network transitions, but not private/private transitions, auto-inhibition also is appropriate on the firewalling function. That is, turning firewalls on by default when any of the attached networks is not one of the reserved networks such as net 10.0.0.0, but leaving firewalls off by default between reserved networks.

Figure 7:
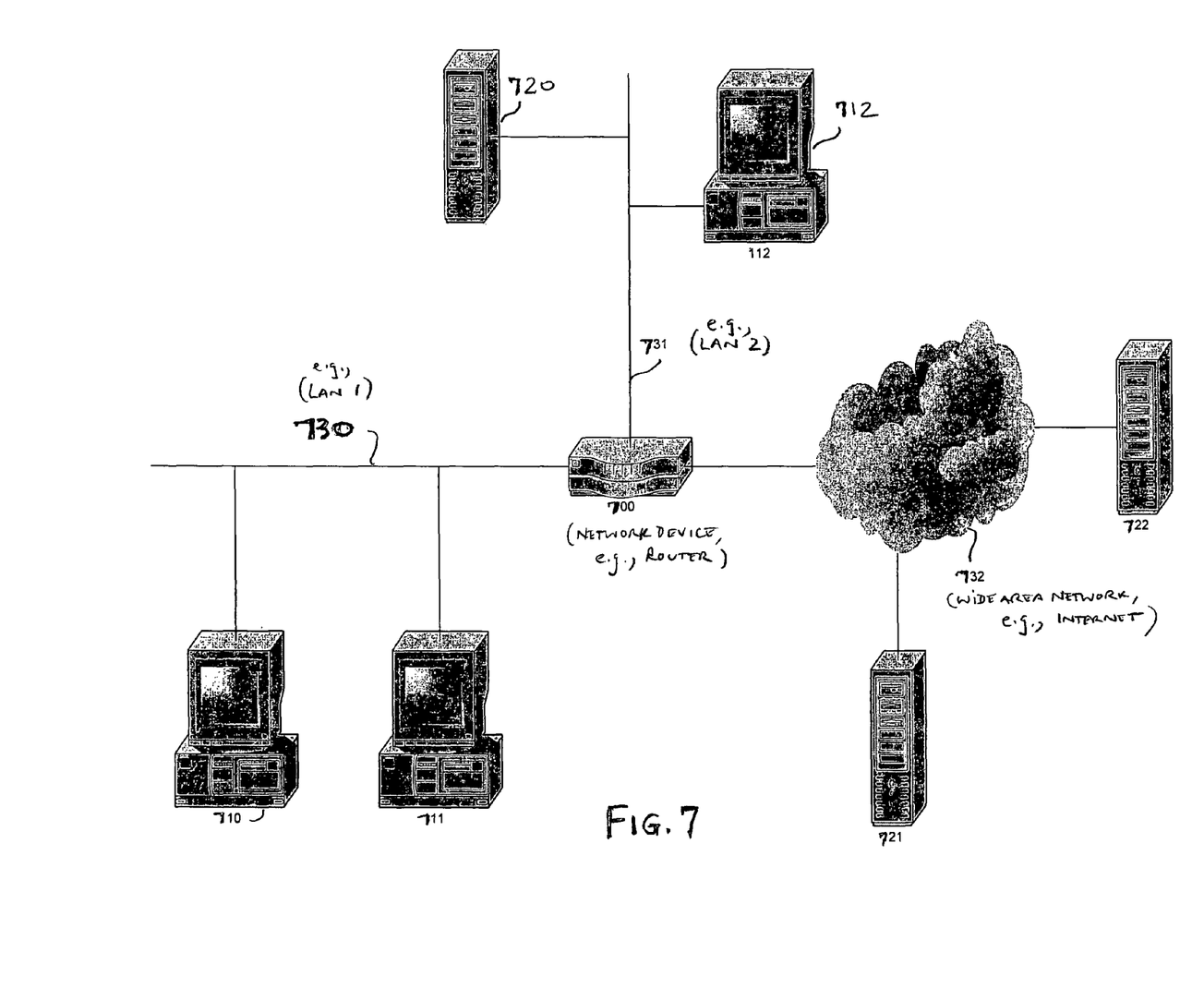
FIG. 7 illustrates an example of a router using auto-inhibition and auto-configuration in accordance with the present invention.

An example of auto-inhibition in a firewall context is illustrated in FIG. 7. This example shows a first network 730, a second network 731, and a third network 732, each connected by a router 700. The router 700 includes two or more ports, as well as conventional operational features such as a processor (or controller or state machine), a memory, and optional non-volatile storage. It is noted that the memory (and optionally the non-volatile storage) include instructions for execution by the processor in accordance with the processes described herein.

Initially, when the router 700 is installed it does not know which services to perform on which ports, or what the network addresses are. In this example, the first 730 and the second networks 731 are private local-area networks, while the third network 732 is a link to a wide area network such as the Internet, which is accessed through, e.g., an Internet service provider.

When the router 700 probes its ports, it receives nothing (but silence) from the first network 730, which has no DHCP server. It receives an answer from a server 720 on the second network 131, which reveals that it is using a private, non-routable network address (10.0.0.0). The router 700 also receives an answer from another server 721 on the wide area network 132, which reveals that it is using a public, routable network address (123.45.0.0). From this information, the router 700 configured to assume that the second 731 and the third networks 732 do not require a DHCP server, but that the first network 130 requires such a server.

In addition, the presence of existing settings in, e.g., the router 700, such as IP address assignments, on a segment implies that the router 700 should adapt itself to these existing conditions rather than attempting to impose fixed factory defaults on the subnet. For example, if an examination of network traffic reveals that the private network is net 10.0.0.0, this value should be used, and not a factory default of, for example, net 192.168.0.0.

Figure 6:
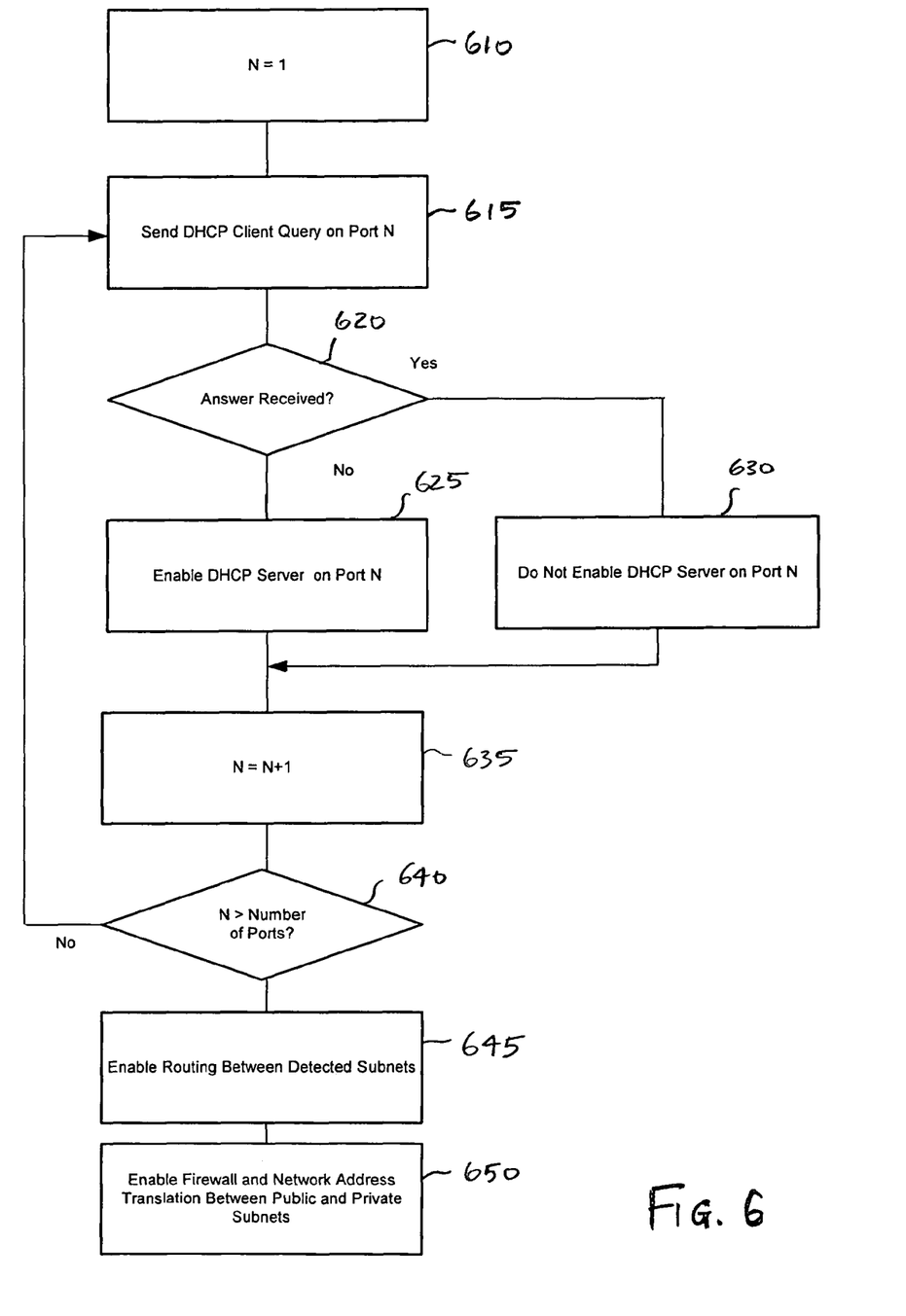
FIG. 6 illustrates an embodiment of a process for auto-inhibition and auto-configuration in accordance with the present invention.

By determining addresses in use and other information about the networks 730, 731, 732, the router can auto-configure itself with reasonable accuracy, and more likely, with greater accuracy than fixed factory defaults. FIG. 6, along with reference to FIG. 7, illustrate an embodiment of a process for auto-inhibition and auto-configuration in accordance with the present invention.

The process in FIG. 6 begins by selecting 610 a port, referenced as port N. The process then sends 615 DHCP client query on port N. If the process does not receive 620 an answer to this query, a DHCP server on port N is enabled 625. If the process receives 620 an answer to this query, a DHCP server on port N is not enabled 630. After an enable or no enable of the DHCP server, the process prepares 635 to move to the next port, N+1. In particular, the process determines if the increment in N is such that it exceeds the number of available ports. If not, the process loops back around to sending 615 a DHCP client query from this next port and works through the process again. If the number of ports is exceeded, the process enables 645 routing between the detected network portions (or subnets). The process then enables 650 a firewall and network address translation between public and private subnets.

Referring to FIG. 7, the DHCP queries return enough information to configure many of the functions within the router 700. The router 700 can assume that the two local networks 730 and 731 are private LANs; because no DHCP server is reachable in the case of the first network 730, and because the network address is reserved for private networks in the case of the second network 731. The third network 732 is a public network, based on its IP address.

Thus, the router 700 can assume that DHCP services are required for the network 730 so that routing between the first network 730 and the second network 731 requires no firewall (i.e., because both are private), but that routing between the private networks 730, 731 and third (i.e., public) network 732 requires a firewall. In addition, because the second network 731 uses a non-routable private network address and the first network 130 will (presumably) be provided by a similarly non-routable address by the router 700, communication between these networks and the third network 132 may require network address translation.

Alternative Embodiments

While the present invention is disclosed in the context of Ethernet ports and cables, the principles articulated herein also applies to other network media, such as fiber optic or wireless connections. For example, selection of a wireless channel, band, transmission standard, and the like can be configured using the principles disclosed herein, for example, identification of message and configuration in view of message format and/or sequence.

In addition, alternative embodiments of the present invention may include the use of identifiers other than TCP options, and protocols other than TCP and IP. For example, auto-assignment may be configured by listening (or "snooping") for traffic that indicates a direction of packet traffic flow, rather than by altering packets. Further, a PEP also can be configured to send new packets as an alternative to altering existing ones, i.e., "probing." Moreover, with respect to auto-assignment and auto-discovery, it also is noted that in one embodiment the auto-assignment of ports uses a like mechanism to one used for auto-discovery of the other unit.

Upon reading this disclosure, those of skill in the art will appreciate still additional alternative structural and functional designs for a system and a process for automatic LAN/WAN port detection, as well as auto-inhibition and auto-configuration, through the disclosed principles of the present invention. Thus, while particular embodiments and applications of the present invention have been illustrated and described, it is to be understood that the invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention as defined in the appended claims.

What is claimed is:

1. An apparatus configured to automatically determine a network connection on a port, the apparatus comprising:
   a first port of the apparatus located between a device on a wide area network (WAN) and a server on a local area network (LAN), the device connected to a client, the first port electrically connected to receive network traffic via the WAN, the first port comprising an Ethernet port;
   a second port of the apparatus electrically connected to receive network traffic via the LAN, the second port comprising an Ethernet port, the apparatus having not yet identified to which of a network segment of the WAN or the LAN is the first port connected;
   a processor of the apparatus configured to:
   execute instructions to monitor network traffic on the first port and the second port to detect whether any packet received is a SYN or a SYN-ACK packet,
   identify, in response to detecting that a SYN-ACK packet from the client was received from the device, that the SYN-ACK packet was received on the first port and that the first port is connected to the WAN;
   automatically assign, responsive to identifying that the SYN-ACK packet was received on the first port, to the first port a function for processing communications for the network segment of the WAN connected to the first port,
   forward, by the apparatus, the SYN-ACK packet from the client to the server;
   identify, in response to detecting that a SYN packet was received from the server, that the SYN packet was received on the second port and that the second port is connected to the LAN;
   automatically assign to the second port a function for processing communications for the network segment of the LAN connected to the second port; and
   operate on subsequent packets arriving on the first port in accordance with the function assigned to the first port.

2. The apparatus of claim 1, wherein the apparatus is further configured to operate on subsequent packets arriving on the second port in accordance with the function assigned to the second port.

3. The apparatus of claim 1, wherein the apparatus is configured to operate the first port at a speed associated with the WAN and operate the second port at a speed associated with the LAN.

4. The apparatus of claim 1, wherein the apparatus removes an ACK tag from the SYN-ACK packet to create an untagged SYN packet.

5. The apparatus of claim 4, wherein the apparatus forwards the untagged SYN packet.

6. The apparatus of claim 1, wherein the apparatus tags the SYN packet with an ACK tag to create a tagged SYN-ACK packet.

7. The apparatus of claim 6, wherein the apparatus forwards the created SYN-ACK packet.

8. The apparatus of claim 1, wherein the apparatus comprises at least one from a group consisting of a router, a gateway, and a firewall.

9. The apparatus of claim 1, wherein the apparatus comprises at least one from a group consisting of a network address translator and a performance enhancing proxy.

10. The apparatus of claim 1, wherein the network traffic is Internet Protocol-based network traffic.

11. The apparatus of claim 1, wherein the SYN-ACK packet is tagged by the device.

12. The apparatus of claim 1, wherein the first and the second ports can be configured to operate on either a WAN or a LAN.

13. The apparatus of claim 1, wherein the apparatus detects the presence of the device responsive to identifying that the received SYN-ACK packet was altered.

14. A method to automatically determine, by an apparatus, a network connection on a port, the method comprising:
   monitoring, by an apparatus between a gateway on a wide area network (WAN) and a server on a local area network (LAN), network traffic on a first port electrically connected to receive network traffic via the WAN, the first port comprising an Ethernet port, the gateway connected to a client;
   monitoring, by the apparatus, network traffic on a second port electrically connected to receive network traffic via the LAN, the second port comprising an Ethernet port, the apparatus having not yet identified to which of a network segment of the WAN or LAN is the first port connected;
   executing, by the apparatus, instructions to detect whether any packet received on the first port or the second port is a SYN or a SYN-ACK packet;
   identifying, by the apparatus, in response to detecting that the SYN-ACK packet from the client was received from the gateway, that the SYN-ACK packet was received on the first port and that the first port is connected to the WAN;
   automatically assigning, by the apparatus, responsive to identifying that the SYN-ACK packet was received on the first port, to the first port a function for processing communications for the network segment of the WAN connected to the first port;
   forwarding, by the apparatus, the SYN-ACK packet from the client to the server;
   identifying, by the apparatus, in response to detecting that a SYN packet was received from the server, that the SYN packet was received on the second port and that the second port is connected to the LAN;
   automatically assigning, by the apparatus, to the second port a function for processing communications for the network segment of the LAN connected to the second port; and
   operating, by the apparatus, on subsequent packets arriving on the first port in accordance with the function assigned to the first port.

15. The method of claim 14, further comprising operating on subsequent packets arriving on the second port in accordance with the function assigned to the second port.

16. The method of claim 14, further comprising operating the first port at a speed associated with the WAN and operating the second port at a speed associated with the LAN.

17. The method of claim 16, further comprising the apparatus removing an ACK tag from the SYN-ACK packet to create an untagged SYN packet.

18. The method of claim 17, further comprising the apparatus forwarding the untagged SYN packet.

19. The method of claim 14, further comprising tagging the SYN packet with an ACK tag to create a tagged SYN-ACK packet.

20. The method of claim 19, further comprising forwarding the created SYN-ACK packet.

21. The method of claim 14, wherein the apparatus comprises one of a router, a gateway or a firewall.

22. The method of claim 14, wherein the apparatus comprises a network address translator.

23. The method of claim 14, wherein the apparatus is a performance enhancing proxy.

24. The method of claim 14, further comprising:
   detecting, by the apparatus, that the SYN-ACK packet from the client was modified with the ACK tag by the gateway;
   removing, by the apparatus, the ACK tag from the SYN-ACK packet to create a SYN packet;
   forwarding, by the apparatus, the created SYN packet to the server.

* * * * *